United States Patent
Pirvu et al.

(10) Patent No.: US 10,915,331 B2
(45) Date of Patent: Feb. 9, 2021

(54) PARTITIONING FLASH AND ENABLING FLEXIBLE BOOT WITH IMAGE UPGRADE CAPABILITIES

(71) Applicant: QUALCOMM Incorporated, San Diego, CA (US)

(72) Inventors: Eugen Pirvu, Mission Viejo, CA (US); Dhamim Packer Ali, San Diego, CA (US); Benish Babu, San Diego, CA (US); Leonard Widra, Fitchburg, WI (US); Darshana Advani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 15/669,257

(22) Filed: Aug. 4, 2017

(65) Prior Publication Data

US 2019/0042278 A1 Feb. 7, 2019

(51) Int. Cl.
*G06F 9/4401* (2018.01)
*G06F 8/658* (2018.01)
*G06F 8/654* (2018.01)

(52) U.S. Cl.
CPC ............ *G06F 9/4411* (2013.01); *G06F 8/654* (2018.02); *G06F 8/658* (2018.02); *G06F 9/4406* (2013.01)

(58) Field of Classification Search
CPC ........ G06F 8/654; G06F 8/658; G06F 9/4406; G06F 9/4411
See application file for complete search history.

(56) References Cited

U.S. PATENT DOCUMENTS

| | | | |
|---|---|---|---|
| 8,954,694 B2 | 2/2015 | Tomlin et al. | |
| 9,235,404 B2 | 1/2016 | Cavalaris et al. | |
| 9,395,968 B1 | 7/2016 | Nallagatla et al. | |
| 9,507,581 B2 | 11/2016 | Butcher et al. | |
| 9,612,887 B2 | 4/2017 | Jayakumar | |
| 2004/0236936 A1* | 11/2004 | Bulusu | G06F 8/65 713/2 |
| 2007/0294685 A1* | 12/2007 | Oh | G06F 8/658 717/168 |

OTHER PUBLICATIONS

International Search Report and Written Opinion—PCT/US2018/041392—ISA/EPO—dated Oct. 18, 2018.

* cited by examiner

*Primary Examiner* — Terrell S Johnson
(74) *Attorney, Agent, or Firm* — QUALCOMM Incorporated

(57) ABSTRACT

Various aspects include methods for implementing a reduced size firmware storage format on a computing device. Various aspects may include storing a first firmware description table to a first sector of a flash memory, in which the first firmware description table may define a first instance of a firmware including describing a first plurality of firmware images, storing the first plurality of firmware images to a first plurality of consecutive sectors, storing a second firmware description table to a second sector, in which the second firmware description table may define a second instance of the firmware including describing a second plurality of firmware images having a third plurality of firmware images, storing the third plurality of firmware images to a second plurality of consecutive sectors, and booting the computing device using the second firmware description table.

30 Claims, 11 Drawing Sheets

300

| Firmware Description Table | |
|---|---|
| Field | Size |
| Signature | 4 bytes |
| Version | 4 bytes |
| Rank | 4 bytes |
| Status | 1 byte |
| No. of Images | 1 bytes |
| PT Entries | 480 bytes |

| Rank | |
|---|---|
| Value | Interpretation |
| 0x00 | Golden Partition |
| 0xFFFFFFFF | Trial Partition |
| 0x00 < Y < 0xFFFFFFFF | Current Partition |

| PT Entry | |
|---|---|
| Field | Size |
| Image ID | 4 bytes |
| Start Sector | 4 bytes |
| Size | 4 bytes |

FIG. 3C

PARTITIONING FLASH AND ENABLING FLEXIBLE BOOT WITH IMAGE UPGRADE CAPABILITIES

BACKGROUND

Many mobile/automotive/server/compute market chips employ a storage format based on a globally unique identifier (GUID) partition table (GPT) specification or equivalent proprietary format. Storage space used by employing such a storage format is usually high and not optimized for very low storage density markets. Because of power, density, and cost constraints, some chips (e.g., chips used mostly in the internet of things (IoT) market space) have very limited flash storage density and capabilities. A feature on most IoT chips is the possibility of updating firmware images over the air (OTA update) and to have the flash storage format and flash storage handling strategy cognizant of this requirement.

SUMMARY

Various disclosed aspects may include apparatuses and methods for implementing a reduced size firmware storage format on a computing device. Various aspects may include storing a first firmware description table to a first sector of a flash memory, in which the first firmware description table may include a first plurality of fields of data configured to define a first instance of a firmware including describing a first plurality of firmware images, storing the first plurality of firmware images to a first plurality of consecutive sectors of the flash memory, storing a second firmware description table to a second sector of the flash memory consecutive to the first sector, in which the second firmware description table may include a second plurality of fields of data configured to define a second instance of the firmware including describing a second plurality of firmware images including a third plurality of firmware images, storing the third plurality of firmware images to a second plurality of consecutive sectors of the flash memory consecutive to the first plurality of consecutive sectors, and booting the computing device using the second firmware description table by executing the second plurality of firmware images.

Some aspects may further include the second plurality of firmware images further including at least one firmware image of the first plurality of firmware images.

In some aspects, describing a first plurality of firmware images may include identifying locations in the flash memory storing the first plurality of firmware images including a first logical partition of the flash memory, and describing a second plurality of firmware images may include identifying locations in the flash memory storing the at least one firmware image of the first plurality of firmware images and the third plurality of firmware images including a second logical partition of the flash memory overlapping the first logical partition at a first location in the flash memory storing the at least one firmware image of the first plurality of firmware images.

Some aspects may further include resetting the computing device in response to receiving the second firmware description table.

Some aspects may further include determining whether booting the computing device using the second firmware description table is successful.

In some aspects, the first plurality of fields of data may include a current partition rank data and a valid status data, and the second plurality of fields of data may include a trial partition rank data and the valid status data. Some aspects may further include in response to determining that booting the computing device using the second firmware description table is successful, setting the trial partition rank data to the current partition rank data and setting the valid status data of the first plurality of fields of data to an invalid status data, and setting the valid status data of the second plurality of fields of data to an invalid status data in response to determining that booting the computing device using the second firmware description table is not successful.

Some aspects may further include setting a forced firmware description table indicator in response to determining that booting the computing device using the second firmware description table is not successful, resetting the computing device, and booting the computing device using a forced firmware description table.

In some aspects, the first plurality of fields of data may include a current partition rank data and a first version data, and the second plurality of fields of data may include the current partition rank data and a second version data configured to indicate that the second instance of the firmware is a newer instance of the firmware than the first instance of the firmware. Some aspects may further include setting a forced firmware description table to the first firmware description table including the first version data in response to determining that booting the computing device using the second firmware description table is not successful, resetting the computing device, and booting the computing device using the forced firmware description table.

Various aspects include computing devices having a flash memory and a processor configured to perform operations of any of the methods summarized above. Various aspects include computing devices having means for performing functions of any of the methods summarized above. Various aspects include a processor readable storage medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

FIGS. 3A-3C are table diagrams illustrating an example reduced size firmware storage format suitable for implementing various aspects.

DETAILED DESCRIPTION

Figure 1:
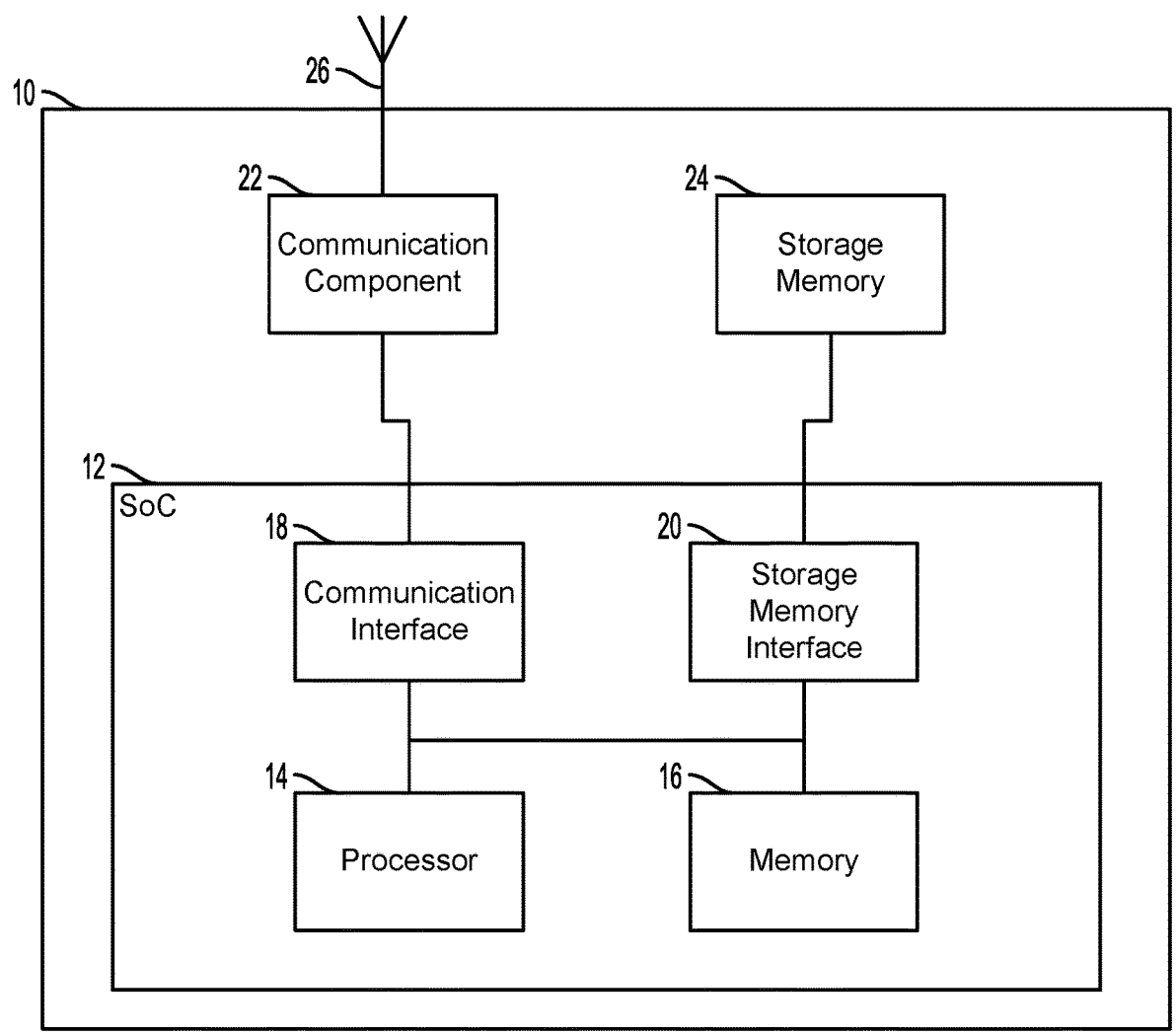
FIG. 1 is a component block diagram illustrating a computing device suitable for implementing various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and computing devices implementing such methods for implementing a reduced size firmware storage format, and update and error management for the firmware storage format. The apparatus and methods of the various aspects may include a firmware storage format that may include a firmware description table configured to describe a version of a firmware and identify the firmware images associated with the firmware version in a manner in which a flash memory is logically partitioned for the different firmware versions with overlapping partitions for images common between firmware versions. The apparatus and methods of various aspects may include update management for the various firmware versions that may test and set a new version of firmware as a current version or an invalid version. The apparatus and methods of various aspects may include error management for the various firmware versions that may identify errors with a current version of the firmware and switch to a previous version of the firmware.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The terms "computing device" and "mobile computing device" may further refer to Internet of Things (IoT) devices, including wired and/or wirelessly connectable appliances and peripheral devices to appliances, décor devices, security devices, environment regulator devices, physiological sensor devices, audio/visual devices, toys, hobby and/or work devices, IoT device hubs, etc. The terms "computing device" and "mobile computing device" may further refer to components of personal and mass transportation vehicles. The term "computing device" may further refer to stationary computing devices including personal computers, desktop computers, all-in-one computers, workstations, super computers, mainframe computers, embedded computers, servers, home media computers, and game consoles.

The firmware storage format may employ a firmware description table (FDT) to reduce a size of a firmware compared to existing firmware storage formats. For example, a firmware storage format employing a globally unique identifier (GUID) partition table (GPT) can use multiple sectors (e.g., 32 KB) of flash storage space of a flash storage device for the GPT alone, whereas a firm storage format employing a firmware description table may reduce the amount of flash storage space in use by using as few as a single sector (e.g., 4 KB) of flash storage space to store a firmware description table. The firm storage formats employing firmware description tables may include firmware description tables of various ranks, including at least a golden version firmware description table (for firmware that is factory certified to be functional), and may further include a current version firmware description table (for firmware that is currently used by a computing device) and/or a trial version firmware description table (for new firmware received in an update, but not confirmed for use by the computing device).

Data of a firmware description table may be stored in a flash memory space at consecutive bits of a sector of the flash memory space. The consecutively stored data of the firmware description table may include a signature (e.g., 4 bytes) configured to identify a firmware; a version (e.g., 4 bytes) configured to indicate a version of the firmware; a rank (e.g., 4 bytes) configured to indicate whether the firmware description table and/or an associated instance of the firmware is ranked golden, current, or trial; a status (e.g., 1 byte) configured to indicate whether the firmware is valid or invalid; a number of images for the firmware (e.g., 1 byte), and partition table (PT) entries (e.g., any size up to a maximum of a remaining space of a designated memory space for storing the firmware description table, such as 480 bytes) configured to provide information for images of the firmware, including the image locations in the flash storage space. In various aspects, the firmware description table may include reserved space (e.g., 18 bytes), which may be used in the future for designation of more space to one or more of the stored data of the firmware description table and/or for designation of space to other stored data of the firmware description table.

The firmware storage format may logically partition the flash storage space with partitions for each firmware description table rank, including a golden partition, a current partition and/or a trial partition. Each partition may contain the images of the page table entries of an associated firmware description table of a matching rank. There does not need to be any physical separation between the partitions. Different instances of the firmware having common images, and, therefore, common page table entries in respective firmware description tables, may have portions of respective partitions overlap for the common images. The firmware storage format may reduce the use of flash storage space by using single versions of common images for different instances of the firmware, instead of storing duplicate versions of common images.

The firmware of a computing device may be updated. For example, a new version of the firmware may be updated using an over the air (OTA) update. Such an update may include receiving a firmware description table and any number of firmware images from a remote sender, such as a manufacturer, via a wired or wireless connection. The computing device may boot using the most recently confirmed instance of the firmware, such as the golden version or the current version. The computing device may receive and store the new version of the firmware, designated as a trial version, storing the images of the trial version of the firmware in the trial partition. The computing device may trigger a reset to boot using the trial version of the firmware. A successful boot may trigger the computing device to set the trial version of the firmware as the current version of the firmware by changing the rank entry of the corresponding firmware description tables. An unsuccessful boot may trigger the computing device to boot using the most recently confirmed instance of the firmware, and to invalidate the trial version of the firmware, such as by changing the status entry of the corresponding firmware description table and/or by invalidating locations in the flash memory space uniquely owned by the trial version of the firmware, including the corresponding firmware description table and/or firmware images.

Error management of the firmware may be implemented using the firmware storage format. The running firmware may detect an error during its execution. In response to the error detection, the firmware may set a forced firmware description table cookie specifying a particular firmware description table from which to boot for a corresponding firmware. The particular firmware description table may be the firmware description table for a previous error free version of the firmware, including the golden version or a previous current version. The computing device may reset and check for whether the forced firmware description table cookie is set, such as by checking a set bit of the forced firmware description table cookie. In response to a set forced firmware description table cookie, the specified firmware description table may be used to boot. In response to no set forced firmware description table cookie, the newest firmware description table may be used to boot.

If the running firmware encounters an unexpected, unrecoverable error, the error may trigger running a primary boot loader (PBL) to track occurrences of the error and compare the occurrences to a threshold. Tracking may be implemented using a counter, a timer, etc. In response to the occurrences exceeding the threshold, the computing device may reset, booting using the firmware description table of a previous error free version of the firmware. In response to the occurrences exceeding the threshold, the primary boot loader may implement an unexpected error handler and run the firmware again.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
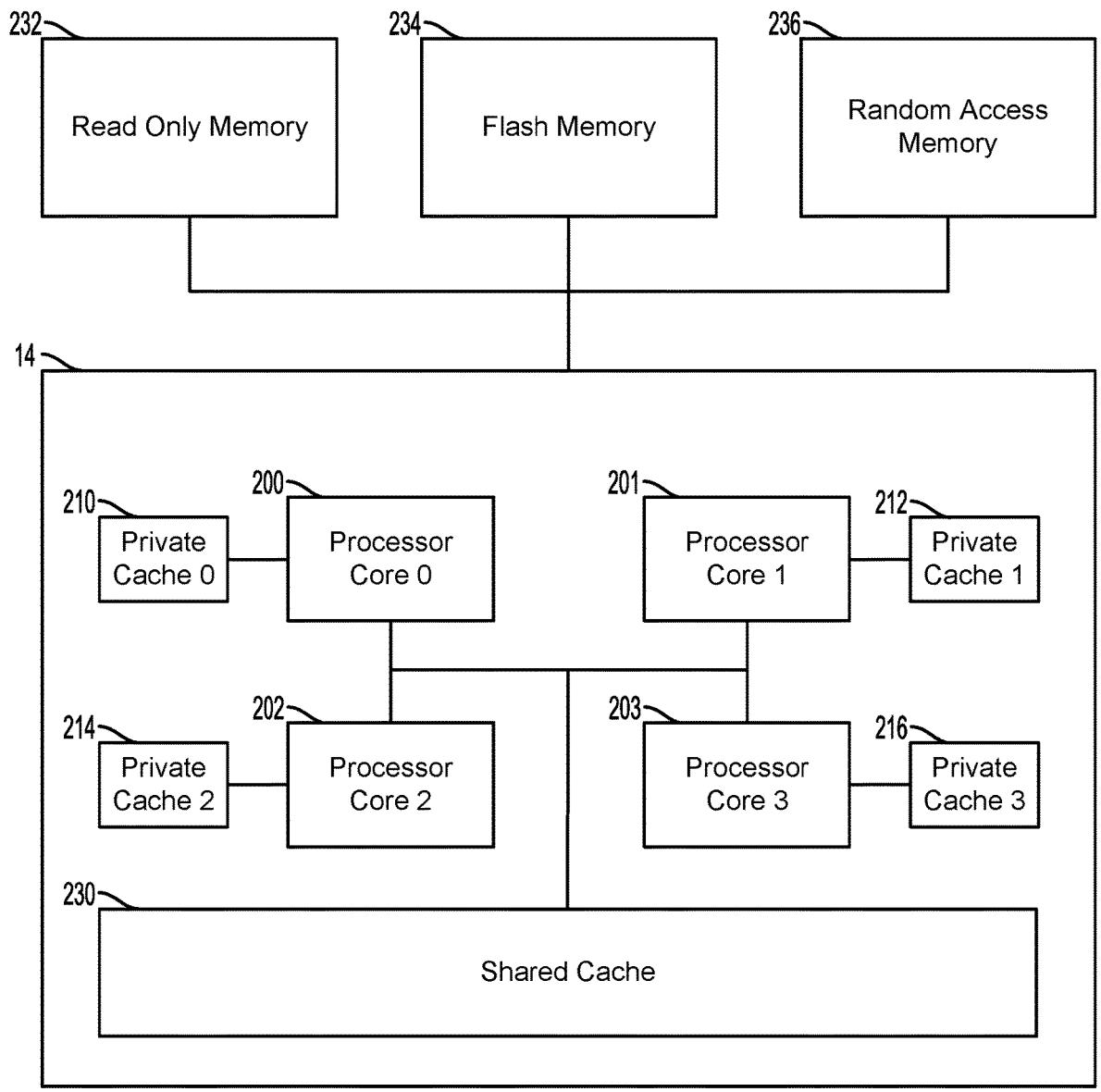
FIG. 2 is a component block diagram illustrating components of a computing device suitable for implementing various aspects.

FIG. 2 illustrates components of a computing device suitable for implementing an aspect. The processor 14 may include multiple processor types, including, for example, a CPU and various hardware accelerators, such as a GPU, a DSP, an APU, subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. The processor 14 may be a GPU or a DSP, and the processor cores 200, 201, 202, 203 may be homogeneous graphics processor cores or digital signal processor cores, respectively. The processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous processors 14. In various aspects, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The processor 14 may further include a shared cache 230 that may be configured to read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the processor 14. The shared cache 230 may include volatile memory as described herein with reference to memory 16 of FIG. 1.

In the example illustrated in FIG. 2, the processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the processor 14 may individually or in combination include fewer or more than the four processor cores 200, 201, 202, 203 and private caches 210, 212, 214, 216 illustrated and described herein.

The processor 14 may also be communicatively connected to a combination of volatile and non-volatile memory devices that are included on and/or separate from and SoC, such as a read only memory (ROM) 232, a flash memory 234, and/or a random access memory (RAM) 236 (any combination of which may be part of the memory 16 in FIG. 1). The read only memory 232 may be a non-volatile and/or non-programmable memory. The read only memory 232 may be configured to store a basic input/output system (BIOS) and/or a primary boot loader (PBL) for the computing device and/or subsystem of the computing device that may be the code used for booting up the computing device and to load higher level code and functionalities, such as those of a firmware, an operating system, and/or other software program. The read only memory 232 may be configured so that the BIOS and primary boot loader code cannot be altered on the read only memory 232 without specific equipment and/or without replacing the read only memory 232. The protection of the BIOS and primary boot loader ensures that the BIOS and primary boot loader will not be corrupted and that computing device will be able to at least boot and initialize the computing device hardware components.

The flash memory 234 may be a non-volatile and/or programmable memory. The flash memory 234 may be configured to store firmware, including code and/or data, for programmable hardware components of the computing device, as described further herein with reference to FIGS. 3-5. The firmware may be configured to provide functionality and control of the programmable hardware components. The firmware may include a firmware description table, as described further herein with reference to FIGS. 3 and 4, and firmware images, which may include code and/or data for executing the firmware. The firmware may be modified and/or updated by overwriting and/or storing additional firmware code and/or data to the flash memory 234. Firmware updates may be used by a manufacture of a computing device to correct bugs in the firmware and/or to provide new and/or updated functionally and/or control of the programmable hardware of the computing device. In various aspects the firmware images of a firmware update may include all of the firmware images for an update instance of the firmware. In various aspects, the firmware images of a firmware update may include the firmware images for an update instance of the firmware that are new to the firmware and/or changed from pervious instances of the firmware.

The random access memory 236 may be a volatile and/or programmable memory. The random access memory 236 may be configured to temporarily store the firmware while the random access memory 236 is powered for access to the firmware for execution of the firmware. The executable portions of the firmware may be in the firmware images loaded to the random access memory. The firmware, in particular the firmware data, may be modified during execution of the firmware to implement the functionality and control of the programmable hardware components in different ways and/or for different programmable hardware components.

The processor 14 may access each of the read only memory 232, the flash memory 234, and/or a random access memory 236. The processor 14 may access the read only memory 232 to retrieve and execute the BIOS and primary boot loader stored in the read only memory. The processor 14 may boot the computing device and/or subsystem of the computing device by executing the BIOS and primary boot loader. The processor 14 may also may access the flash memory 234 to retrieve the firmware and store the firmware to the random access memory 236. The processor 14 may also access the flash memory 234 to implement updates to the firmware in the flash memory 234. The processor 14 may access the random access memory 236 to store, retrieve, and modify the firmware to execute the functionality and control of the programmable hardware components of the computing device.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

FIGS. 3A-3C illustrate an example reduced size firmware storage format suitable for implementing various aspects. The tables 300, 302, 304 in FIGS. 3A-3C are representations of a firmware description table 300 in FIG. 3A, a rank table 302 in FIG. 3B, and a partition table entry table 304 in FIG. 3C. In various aspects the tables 300, 302, 304 may be descriptive of the types and sizes data of firmware a description table in a flash memory (e.g., flash memory 234 in FIG. 2), but not necessarily the structure of how the data is stored in the flash memory, as described further herein with reference to FIG. 4.

FIG. 3A illustrates an example firmware description table 300. The firmware description table 300 may include a number of fields corresponding to types of firmware description table data stored in the flash memory and sizes of the types of firmware description table data in the flash memory. The firmware description table 300 may include data in the fields of the firmware description table 300 that is configured to identify and define an instance of a firmware. In various aspects, the firmware description table 300 may include data in the fields of the firmware description table 300 of data types including a signature, a version, a rank, a status, number (no.) of firmware images, and/or partition table (PT) entries. Signature data in a signature field of the firmware description table 300 may be configured to identify a firmware. For example, calls for execution of the firmware may be made using the signature data from the signature field in the firmware description table 300 to identify the correct firmware for execution. In various aspects, the signature data from the signature field in the firmware description table 300 may use any amount of space in the flash memory, such as four (4) bytes of space in the flash memory.

Version data in a version field of the firmware description table 300 may be configured to identify an instance of the firmware from among other instances of the firmware with different values for the version data. In various aspects, instances of the firmware may be issued with sequential values for the version data, and the version data in the version field of the firmware description table 300 may indicate an age of the instance of the firmware relative to an age of another instance of the firmware. For example, in a scheme of increasing values for successive instances of the firmware, lower value version data in the version field of the firmware description table 300 relative to another value version data in a version field of another firmware description table may indicate an older instance of the firmware relative to another instance of the firmware.

In various aspects, version data in the version field of the firmware description table 300 may be used to prioritize the instances of the firmware. In various aspects, any scheme may be used to assign version data of an instance of the firmware, and similar schemes may be used to determine relative relationships between multiple instances of the firmware. In various aspects, different instances of the firmware may have at least one different partition table entry from each other. In various aspects, the signature firmware description table data may use any amount of space in the flash memory, such as four (4) bytes of space in the flash memory.

Together, the signature data in the signature field of the firmware description table 300 and version data in the version field of the firmware description table 300 may uniquely identify a particular instance of a firmware. For example, the signature data in the signature field of the firmware description table 300 may be used to identify all instances of the firmware sharing the same signature data from firmware having different data. Further, the version data in the version field of the firmware description table 300 may be used to uniquely identify the instance of the firmware from among a set of instances of the firmware sharing the same signature data in the signature fields of multiple firmware description tables.

A portion of rank data in a rank field of the firmware description table 300 may be configured to indicate a reliability level of an instance of the firmware. In various aspects, the rank table 302 in FIG. 3B may illustrate potential values for the rank data in the rank field of the firmware description table 300, and associated interpretations of those rank firmware data by the computing device. The rank data in the rank field of the firmware description table 300 may dictate how the instance of the firmware is handled and executed, as described further herein with reference to FIGS. 6-9. In various aspects, the rank data in the rank field of the firmware description table 300 may use any amount of space in the flash memory, such as four (4) bytes of space in the flash memory.

In various aspects, a value may be associated with a golden partition, which may indicate that the instance of the firmware having this value for the rank data in the rank field of the firmware description table 300 is a most trusted firmware. In various aspects, golden partition rank data in the rank field of the firmware description table 300 may indicate that the firmware images of the instance of the firmware were loaded to the flash memory by the manufacturer. The golden partition rank instance of the firmware may be used to boot the computing device and/or the subsystems of the computing device any time. In various aspects, the golden partition rank instance of the firmware may be the only instance of the firmware stored on the flash memory before an update to the firmware is implemented. In various aspects, the golden partition rank instance of the firmware may be used to boot the computing device and/or the subsystems of the computing device in response to various criteria indicating failure and/or errors in booting the computing device and/or the subsystems of the computing device using a different rank instance of the firmware. In various aspects, the value for the rank data in the rank field of the firmware description table 300 associated with the golden partition rank may include any value, including any end value of a set of rank values, such as a minimum value, like a zero value (e.g., 0x00).

In various aspects, a value different from the value associated with the golden partition may be associated with a trial partition, which may indicate that the instance of the firmware having this value for the rank data in the rank field of the firmware description table 300 is an update of the firmware. In various aspects, trial partition rank data in the rank field of the firmware description table 300 may indicate that the firmware images of the instance of the firmware are updates to firmware images previously stored to the flash memory by the manufacturer and/or by previous updates. The trial partition rank instance of the firmware may be used to boot the computing device and/or the subsystems of the computing device to test the reliability of the firmware images of a trial partition rank instance of the firmware. In various aspects, the value for the rank data in the rank field of the firmware description table 300 associated with the golden partition rank may include any value, including any end value of a set of rank values, such as a maximum value (e.g., 0xFFFFFFFF).

In various aspects, a value different from the values associated with the golden partition and the trial partition may be associated with a current partition, which may indicate that the instance of the firmware having this value for the rank data in the rank field of the firmware description table 300 is a reliable version of the firmware that may be used to boot the computing device. In various aspects, current partition rank data in the rank field of the firmware description table 300 may indicate that the firmware images of the instance of the firmware are previous updates to firmware images stored to the flash memory by the manufacturer and/or by previous updates.

The current partition rank instance of the firmware may be generally used to boot the computing device and/or the subsystems of the computing device. In various aspects, multiple current partition rank instances of the firmware may be stored on the flash memory. The current partition rank instances of the firmware may indicate that the firmware images of the instances of the firmware are updates to firmware images previously stored to the flash memory by the manufacturer and/or by previous updates. The current partition rank instances of the firmware may be former trial partition rank instances of the firmware that have been determined to be reliable and the trial partition rank has been converted to the current partition rank. In various aspects, the value for the rank data in the rank field of the firmware description table 300 associated with the current partition rank may include any value, including any value between end values of a set of rank values, such as any value between a minimum value and a maximum value (e.g., 0x00<Y<0xFFFFFFFF).

In various aspects, the current partition rank instance of the firmware may be used to boot the computing device and/or the subsystems of the computing device in response to various criteria indicating failure and/or errors in booting the computing device and/or the subsystems of the computing device using a different current and/or trial partition rank instance of the firmware.

Status data in a status field of the firmware description table 300 may be configured to identify a validity of an instance of the firmware. The validity of the instance of the firmware may indicate whether the instance of the firmware is deemed to be a reliable instance of the firmware that may have been previously successfully executed without error. Instances of the firmware having valid status data in the status field of the firmware description table 300 may be executed by the computing device, and instances of the firmware having invalid status data in the status field of the firmware description table 300 may not be executed by the computing device. Instances of the firmware may have valid status data in the status field of the firmware description table 300 by default until they are deemed to be unreliable instance of the firmware by various criteria, as described further herein with reference to FIGS. 6-9. An instance of the firmware deemed to be unreliable may have its valid status data in the status field of the firmware description table 300 altered to invalid status data in the status field of the firmware description table 300. Multiple instances of a firmware may have valid or invalid status data in the status fields of multiple firmware description tables. In various aspects, the status data in the status field of the firmware description table 300 may use any amount of space in the flash memory, such as one (1) byte of space in the flash memory.

Together, the rank data in the rank field of the firmware description table 300 and status data in the status field of the firmware description table 300 may be used to determine an order of execution of various instances of a firmware, as described further herein with reference to FIGS. 6-9. For example, from a not booted state, the computing device may boot using an instance of a firmware having a current or golden partition rank data in the rank field of the firmware description table 300 and valid status data in the status field of the firmware description table 300. On a running (i.e., currently booted) computing device, during a reboot the computing device may boot using an instance of a firmware having a trial, current, or golden partition rank data in the rank field of the firmware description table 300 and valid status data in the status field of the firmware description table 300. In response to an error in executing a trial or current partition rank instance of the firmware, the computing device may switch to booting using an instance of a firmware having a current or golden partition rank data in the rank field of the firmware description table 300 and valid status data in the status field of the firmware description table 300.

In various aspects, the computing device may boot using various versions of the firmware in increasing order of reliability, such as starting with a lower reliability trial or current partition rank instance of the firmware and switching to a higher reliability current or golden partition rank instance of the firmware upon a failure or error in executing the lower reliability trial or current partition rank instance of the firmware. In various aspects, between multiple current partition rank instance of the firmware, the version data in the version field of the firmware description table 300 may also be used to determine an order of execution of the instances of the firmware. For example, to switch to a higher reliability current partition rank instance of the firmware, valid and current partition rank instance of the firmware may be executed in order of increasing age, i.e., newest to oldest.

A number of images data in a number of images field of the firmware description table 300 may be configured to identify a number of firmware images of an instance of the firmware. Various instances of a firmware may include different numbers of firmware images as each update version of an instance of the firmware may include additional or fewer firmware images for the instance of the firmware compared to the firmware images included in previous instances of the firmware. Additional firmware images may provide new and/or altered functionality for the firmware, and fewer firmware images may remover functionality for the firmware and/or be used to simplify code for the firmware. Any overlapping firmware images among different instances of the firmware may be included in the number of images data in the number of images field of the firmware description table 300 for each instance of the firmware. In various aspects, the number of images data in the number of images field of the firmware description table 300 may use any amount of space in the flash memory, such as one (1) byte of space in the flash memory.

In various aspects, the firmware description table 300 may additionally include reserved data fields, which may be configured to be place holders in the flash memory for expansion of space for the fields of the firmware description table 300 and/or future types of fields and data that may be added to the firmware description table 300. Reserved fields of the firmware description table 300 may use any amount of space in the flash memory, such as eighteen (18) bytes of space in the flash memory.

A partition table (PT) entry data in a partition table entry field of the firmware description table 300 may be configured to identify and describe firmware images of an instance of the firmware. In various aspects, the partition table entry table 304 in FIG. 3C may illustrate fields corresponding to further types of data in fields of the firmware description table 300 stored in the flash memory and sizes of the types of data in the firmware description table 300 in the flash memory. The partition table entry table 304 may be a subset of the larger firmware description table 300. In various aspects, the partition table entry table 304 may include data in fields of the of data types including an image identifier (ID), a start sector, and/or a size.

The data in fields of the partition table entry table 304 may be included in the firmware description table 300 for each firmware image of an instance of the firmware. In various aspects, each firmware image of an instance of the firmware may be identified and described by a set of data in the fields of the partition table entry table 304. In various aspects, different firmware partition tables 300 may include any combination of same and different data in the fields of the partition table entry table 304. Shared same data in the fields of the partition table entry table 304 may be for original and/or updated firmware images shared by instances of the firmware described by respective firmware description tables 300. Different data in the fields of the partition table entry table 304 may be for different and/or updated firmware images not shared between the respective firmware description tables 300. The terms "data in the 'X' field of the partition table entry table 304" and "data in the 'X' field of the firmware description table 300" may be used interchangeably herein.

An image identifier data in an image identifier field of the partition table entry table 304 may be configured to identify a firmware image. For example, calls for execution of the firmware image may be made using the image identifier data in the image identifier field of the partition table entry table 304 to identify the correct firmware image for execution. In various aspects, the image identifier data in the image identifier field of the partition table entry table 304 may use any amount of space in the flash memory, such as four (4) bytes of space in the flash memory.

A start sector data in a start sector field of the partition table entry table 304 may be configured to identify a location of a firmware image in the flash memory. As described further herein with reference to FIG. 5, the various instances of the firmware may have their firmware images stored in partitions of the flash memory corresponding to their rank. The partitions of the flash memory may include any number of units, such as sectors, of the flash memory. The start sector data in the start sector field of the partition table entry table 304 may specify a sector of the flash memory storing the firmware image. The start sector data in the start sector field of the partition table entry table 304 may be used to retrieve the firmware image from the flash memory for execution and/or to be written to the random access memory. In various aspects, the start sector data in the start sector field of the partition table entry table 304 may use any amount of space in the flash memory, such as four (4) bytes of space in the flash memory.

Size data in a size field of the partition table entry table 304 may be configured to indicate a size of a firmware image in the flash memory. The size data in the size field of the partition table entry table 304 may be expressed in any units of the flash memory, such as various scales of bits and/or bytes. The size data in the size field of the partition table entry table 304 may be used to retrieve the firmware image from the flash memory for execution and/or to be written to the random access memory. In various aspects, the size data in the size field of the partition table entry table 304 may use any amount of space in the flash memory, such as four (4) bytes of space in the flash memory.

In various aspects, the partition table entry table 304 may additionally include reserved data fields, which may be configured to be a place holder in the flash memory for expansion of space for the fields of partition table entry table 304 and/or future types of fields and data that may be added to the partition table entry table 304. Reserved data fields of the partition table entry table 304 may use any amount of space in the flash memory, such as four (4) bytes of space in the flash memory.

As described herein, each field of the firmware description table 300 may use a designated amount of space in the flash memory. In various aspects, the space in the flash memory used by the fields may be configured so that the firmware description table 300 may be stored in a single unit, such as a sector, of flash memory. A minimum of one firmware description table 300 may be stored in the flash memory, and it may be stored at a first/beginning sector of the flash memory, such as the sector with the lowest address in the flash memory. The firmware description table 300 that may be the only firmware description table 300 stored in the flash memory may be a golden firmware description table 300, a firmware description table 300 having a golden partition rank data in the rank field of the firmware description table 300. Any number of firmware description tables 300 may be stored in the flash memory. In some aspects, the firmware descriptions tables 300 may be stored in consecutive sectors in the flash memory. In some aspects, a maximum of three (3) firmware description tables 300 may be stored in the flash memory. In various aspects, each of the maximum of three firmware description tables 300 may include a different rank data in the rank field of the firmware description table 300. The amount of space of the flash memory that a sector may use may depend on a configuration of the computing device. In an example, a sector may be 4 KB, and the firmware description tables 300 may use between 4 KB of the flash memory for each firmware description table 300. For a maximum of three firmware description tables 300, the total storage overhead for firmware description tables 300 may be 12 KB.

Figure 4:
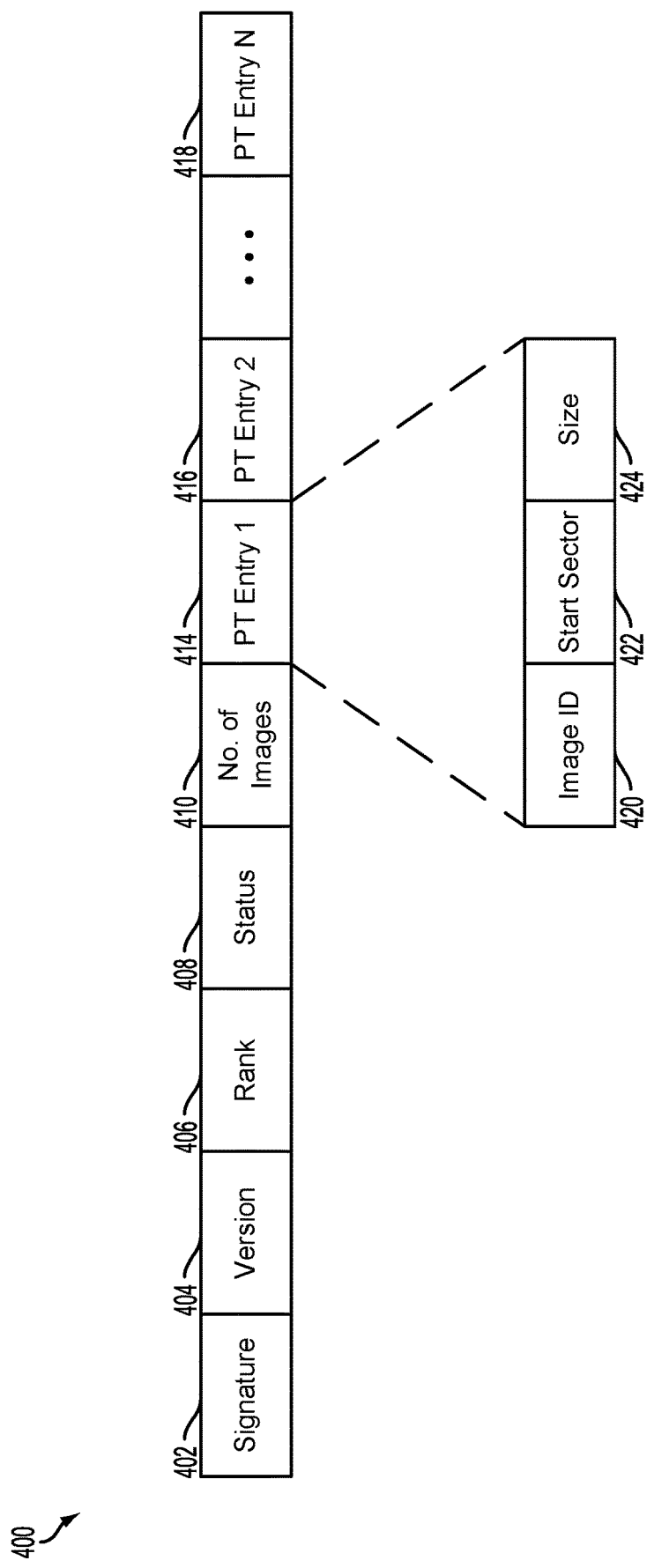
FIG. 4 is a block diagram illustrating an example reduced size firmware storage format in flash memory suitable for implementing various aspects.

FIG. 4 illustrates an example reduced size firmware storage format in flash memory suitable for implementing various aspects. As described herein, the firmware description table data may be stored in a sector 400 of the flash memory (e.g., flash memory 234 in FIG. 2). In various aspects, the firmware description table data corresponding to the fields of the firmware description table (e.g., signature 402, version 404, rank 406, status 408, number (no.) of images 410, partition table (PT) entry 1 414, partition table entry 2 416, partition table entry N 418) may be stored as consecutive bits of data in the sector 400 of the flash memory. The fields of the partition table entries 414, 416, 418 may be subdivided into the fields of the partition table entry table (e.g., image identifier (ID) 420, start sector 422, size 424). The number of fields of the partition table entries 414, 416, 418 may be any integer N. In various aspects, the firmware description table data of multiple firmware description tables may be stored in the flash memory in the same manner in consecutive sectors 400 in the flash memory. In various aspects, the firmware description table data corresponding to the fields of the firmware description table may be arranged in any order in a sector 400 of the flash memory. In various aspects, consecutive bits of data in the sector 400 of the flash memory may include reserved bits and/or the subdivided fields of the partition table entries 414, 416, 418 may include reserved bits.

Figure 5:
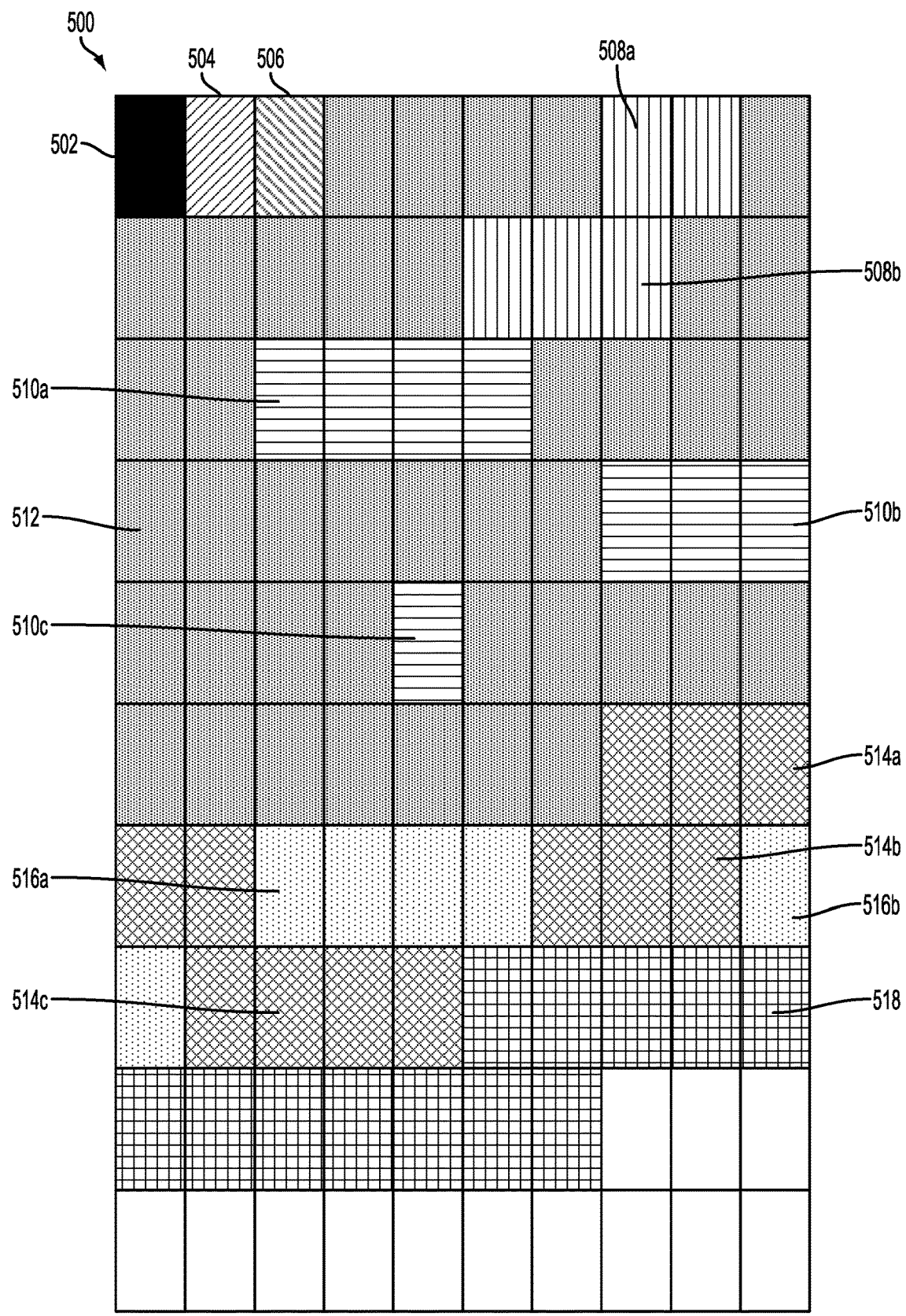
FIG. 5 is a block diagram illustrating an example reduced size firmware storage format in flash memory suitable for implementing various aspects.

FIG. 5 illustrates an example reduced size firmware storage format in flash memory suitable for implementing various aspects. A flash memory 500 (e.g., flash memory 234 in FIG. 2) may be configured to store the firmware description tables and the firmware images. As described herein, the firmware description tables may be stored in consecutive sectors 502, 504, 506 in the flash memory 500 starting at a first/beginning sector 502 of the flash memory 500. In various aspects, each of the sectors 502, 504, 506 storing a firmware description table may store a firmware description table having a different rank data in the rank field of the firmware description table (e.g., firmware description table 300) from the other firmware description tables. For example, sector 502 may store the golden firmware description table, sector 504 may store a current firmware description table, and sector 506 may store a trial firmware description table.

Further, the flash memory 500 may be logically partitioned so that any number of logical partitions may be configured to store the firmware images included in a firmware description table. The firmware images may be stored in consecutive sectors of the flash memory following the sectors 502, 504, 506 storing the firmware description tables. Logical partitions may be associated with a firmware description table. For example, the golden partition rank firmware description table may be associated with a golden logical partition configured to store the firmware images included in the golden partition rank firmware description table. In the example illustrated in FIG. 5, the golden logical partition may include logical partitions 508a, 508b, 510a, 510b 510c, 512. Similarly, the current partition rank firmware description table may be associated with a current logical partition configured to store the firmware images included in the current partition rank firmware description table. In the example illustrated in FIG. 5, the current logical partition may include logical partitions 510a, 510b 510c, 512, 514a, 514b, 514c, 516a, 516b. The trial partition rank firmware description table may be associated with a trial logical partition configured to store the firmware images included in the trial partition rank firmware description table. In the example illustrated in FIG. 5, the trial logical partition may include logical partitions 512, 516a, 516b, 518.

The golden logical partition, the current logical partition, and the trial logical partition may be defined by the locations of the firmware images included in the respective firmware description tables' partition table entry table data. As described herein, different firmware partition tables may include any combination of same and different partition table entry table data. In other words, the golden logical partition, the current logical partition, and the trial logical partition may be wholly separate from and/or partially overlapping with any of the other logical partitions. There may be no physical separation between the logical partitions in the flash memory 500. In the example illustrated in FIG. 5, the golden logical partition, the current logical partition and/or the trial logical partition may partially overlap. The logical partitions 508a, 508b may be exclusive to the golden logical partition. The logical partitions 510a, 510b, 510c may include overlapping portions of the golden logical partition and the current logical partition. The logical partition 512 may include overlapping portions of the golden logical partition, the current logical partition, and the trial logical partition. The logical partitions 514a, 514b, 514c may be exclusive to the current logical partition. The logical partitions 516a, 516b may include overlapping portions of the current logical partition and the trial logical partition. The logical partition 518 may be exclusive to the trial logical partition.

Figure 6:
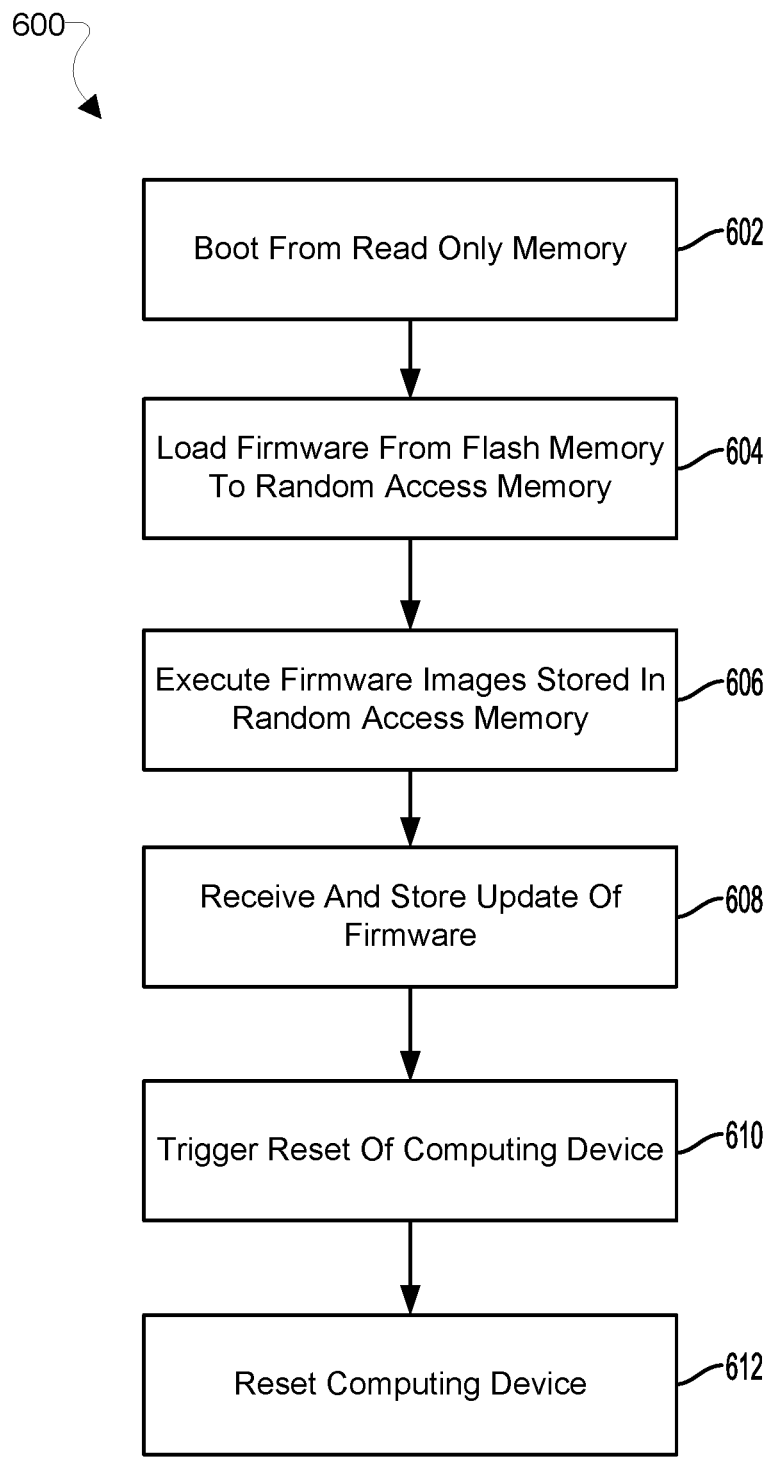
FIG. 6 is a process flow diagram illustrating a method for loading and updating a reduced size firmware storage format suitable according to an aspect.

FIG. 6 illustrates a method 600 for implementing loading and updating a reduced size firmware storage format according to an aspect. The method 600 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, read only memory 232, flash memory 234, and random access memory 236 in FIG. 2, flash memory 500 in FIG. 5), and various memory/cache controllers. In order to encompass the alternative configurations enabled in various aspects, the hardware implementing the method 600 is referred to herein as a "processing device."

In block 602, the processing device may boot the computing device and/or subsystem of the computing device using code stored in the read only memory. In various aspects, the processing device may execute the BIOS and/or primary boot loader stored in the read only memory to execute the boot process.

In block 604, the processing device may retrieve a firmware from the flash memory and load the firmware to the random access memory. Retrieving the firmware from the flash memory may include retrieving the most recent instance of the firmware that includes a valid status data in the status field of the firmware description table. For example, a current partition rank instance of the firmware may be retrieved rather that a golden partition rank instance of the firmware. The valid status data in the status field of the firmware description table for the current partition rank instance of the firmware may indicate that the current partition rank instance of the firmware is reliable for use to boot the computing device and/or subsystem of the computing device. In various aspects, during an initial boot from a not booted state, there may not be a trial partition rank instance of the firmware with a valid status data in the status field of the firmware description table stored in the flash memory. As described further herein, in response to receiving a trial partition rank instance of the firmware, the trial partition rank instance of the firmware may be tested for reliability. In response to being deemed reliable, the trial partition rank instance of the firmware may be converted to a current partition rank instance of the firmware, and in response to being deemed not reliable, the trial partition rank instance of the firmware may be set with an invalid status data in the status field of the firmware description table. In various aspects, retrieving the firmware may include retrieving the firmware description table and/or the firmware images of an instance of the firmware. The firmware retrieved from the flash memory may be stored in the random access memory for execution of the firmware.

In block 606, the processing device may execute the firmware images stored in the random access memory. Executing the firmware images may continue the booting process, and result in implementation of functions and controls of a programmable hardware component of the computing device associated with the firmware.

In block 608, the processing device may receive an update of the firmware and store the update of the firmware to the flash memory. The update of the firmware may include a trial partition rank firmware description table and at least one firmware image. In various aspects, trial partition rank firmware description table may be configured to describe firmware images including any combination of at least one firmware image of a previous firmware description table (e.g., the golden rank partition firmware description table and/or a current rank partition firmware description table) and/or any number of new firmware images. In various aspects, the processing device may receive the update of the firmware as an over the air update sent by a manufacturer of the computing device and/or components of the computing device and/or a third party, such as a vendor or service provider. The processing device may receive the update of the firmware via a wired and/or wireless connection. The processing device may store the trial partition rank firmware description table in a consecutive sector of the flash memory to the sector for storing a current partition rank firmware description table. Similarly, the processing device may store any new firmware images in consecutive sectors of the flash memory to the last sector storing firmware images added to the flash memory for the current partition rank instance of the firmware. In various aspects, multiple updates may occur in a ping-pong manner in which the sector of the flash memory for storing a current partition rank firmware description table becomes the sector of the flash memory for storing a trial partition rank firmware description table, and the sector for storing a trial partition rank firmware description table becomes the sector for storing a current partition rank firmware description table. The switch in designation for storing different rank firmware description tables may occur based on confirmation of a trial partition rank firmware description table as a valid current rank firmware description table. Similar ping-pong allocations of sectors of the flash memory for storing the firmware images associated with the different rank firmware description tables may be implemented.

In block 610, the processing device may trigger a reset of the computing device and/or subsystem of the computing device. The reset may be triggered in response to the receipt and storage of the update to the firmware.

In block 612, the processing device may reset the computing device and/or subsystem of the computing device. Resetting the computing device and/or subsystem of the computing device is described further herein with reference to the methods 700, 800, 900 in FIGS. 7-9, any of which may be implemented depending on a configuration of the computing device.

Figure 7:
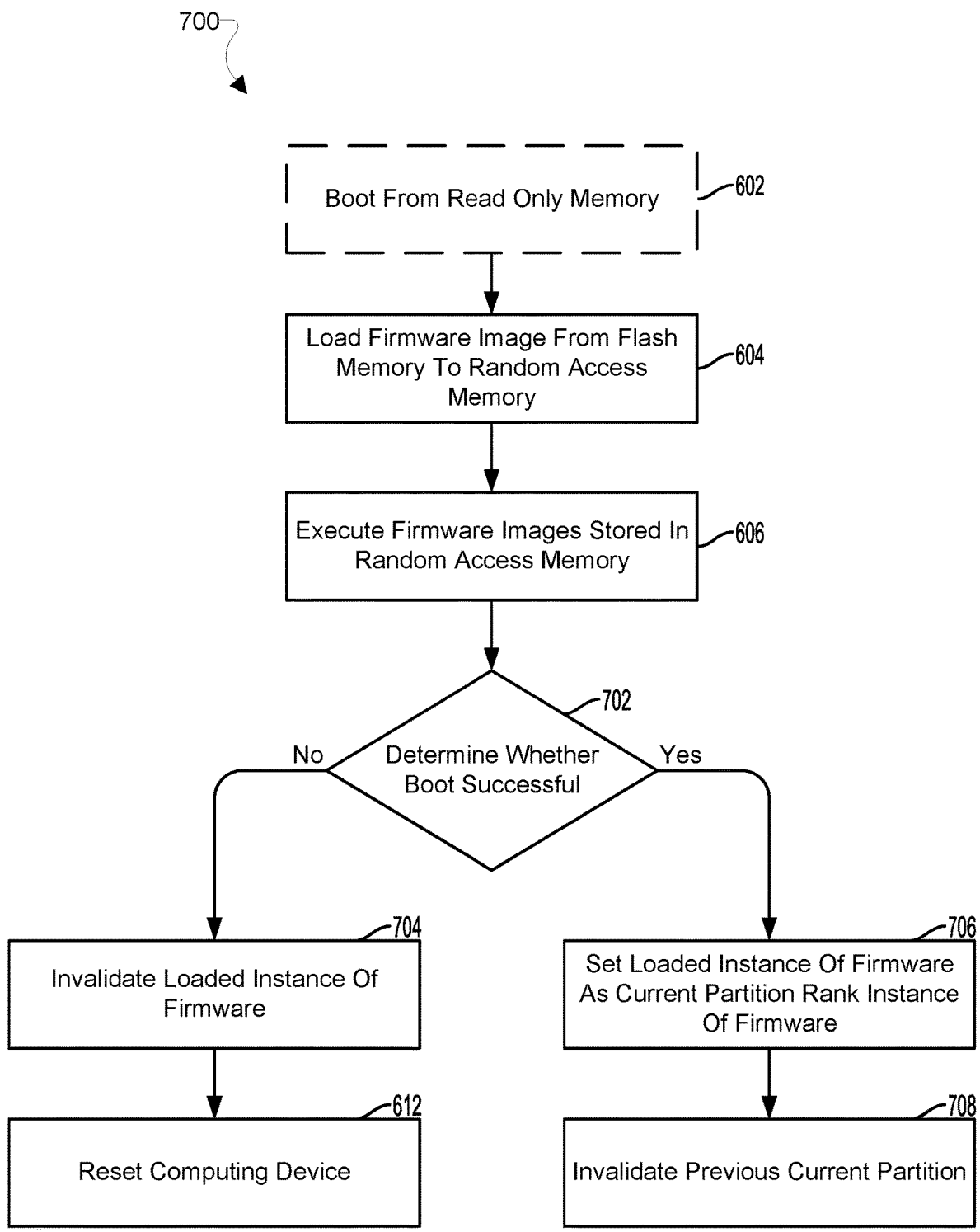
FIG. 7 is a process flow diagram illustrating a method for loading and updating a reduced size firmware storage format suitable according to an aspect.

FIG. 7 illustrates a method 700 for implementing loading and updating a reduced size firmware storage format suitable according to an aspect. The method 700 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, read only memory 232, flash memory 234, and random access memory 236 in FIG. 2, flash memory 500 in FIG. 5), and various memory/cache controllers. In order to encompass the alternative configurations enabled in various aspects, the hardware implementing the method 700 is referred to herein as a "processing device." In various aspects, the method 700 may further describe block 612 of the method 600 in FIG. 6 and/or be implemented as a standalone method.

In optional block 602, the processing device may boot the computing device and/or subsystem of the computing device using code stored in the read only memory, as describe with reference to block 602 of the method 600 in FIG. 6. In various aspects, booting the computing device and/or subsystem of the computing device using code stored in the read only memory may be implemented in optional block 602 for booting the computing device and/or subsystem of the computing device during an initial boot from a not booted state and/or during a reboot. In various aspects, it may not be necessary to repeat booting the computing device and/or subsystem of the computing device using code stored in the read only memory in optional block 602 during a reboot as states and initializations of computing device components may be saved.

In block 604, the processing device may retrieve a firmware from the flash memory and load the firmware to the random access memory, as describe with reference to block 604 of the method 600 in FIG. 6. Retrieving the firmware from the flash memory may include retrieving the most recent instance of the firmware that includes valid status data in the status field of the firmware description table. For example, a stored update of the firmware may include trial partition rank data in the rank field of the firmware table description indicating that the update of the firmware is a most recent instance of the firmware. The stored update of the firmware may also include valid status data in the status field of the firmware description table to ensure that the instance of the firmware is executed upon the next boot and/or reboot to execute the most recent instance of the firmware. The firmware retrieved from the flash memory may be stored in the random access memory for execution of the firmware.

In block 606, the processing device may execute the firmware images stored in the random access memory, as described with reference to block 606 of the method 600 in FIG. 6. Executing the firmware images may be a portion of the booting and/or rebooting process.

In determination block 702, the processing device may determine whether booting the computing device and/or a subsystem of the computing device was successful. In various aspects, determining whether the boot was successful may include determining whether an error is detected for executing the firmware images stored in the random access memory indicating that the boot was unsuccessful. In various aspects, determining whether the boot was successful may include determining whether a number of errors detected exceed an error threshold indicating that the boot was unsuccessful. In various aspects, determining whether the boot was successful may include determining whether the boot complete before a timeout threshold indicating that the boot was successful.

In response to determining that the boot was unsuccessful (i.e., determination block 702="No"), the processing device may invalidate the loaded instance of the firmware in block 704. In various aspects, the loaded instance of the firmware may be a trial rank partition instance of the firmware received as an update to the firmware. To invalidate the loaded instance of the firmware, the processing device may alter the status data in the status field of the firmware description table of the loaded instance of the firmware from a valid value to an invalid value in the flash memory.

In block 612, the processing device may reset the computing device and/or subsystem of the computing device, as described with reference to block 612 of the method 600 in FIG. 6.

In response to determining that the boot was successful (i.e., determination block 702="Yes"), the processing device may set the loaded instance of the firmware as a current partition rank instance of the firmware in block 706. The processing device may alter the rank data in the rank field of the firmware description table of the loaded instance of the firmware from a trial partition value to a current partition value in the flash memory. The current partition value may include a next sequential current partition value between end values of a set of rank values. In various aspects, such as the ping-pong manner updates, there may be no movement of the firmware description tables and/or firmware images within the flash memory based on changing the rank data in the rank fields of the firmware description tables as designation of the sectors of the flash memory may change corresponding to the changes to the rank data in the rank fields of the firmware description tables.

In various aspects, setting the loaded instance of the firmware as a current partition rank instance of the firmware may include writing the firmware description table to the sector of the flash memory used for the current partition rank firmware description table. In various aspects, setting the loaded instance of the firmware as a current partition rank instance of the firmware may include writing the firmware images of the loaded instance of the firmware to consecutive sectors of the flash memory following the sectors of the flash memory storing the firmware images of the golden partition rank instance of the firmware and/or the firmware images of a previous current partition rank instance of the firmware that are used by the loaded instance of the firmware. In various aspects, writing the firmware description table and/or the firmware images of the loaded instance of the firmware to the flash memory may occur in response to a command to shutdown and/or reboot the computing device and/or the subsystem of the computing device, and may occur after invalidating a previous current partition rank instance of the firmware In block 708, the processing device may invalidate a previous current partition rank instance of the firmware. To invalidate the previous current partition rank instance of the firmware, the processing device may alter the status data in the status field of the firmware description table of the loaded instance of the firmware from a valid value to an invalid value in the flash memory. In various aspects, invalidating the previous current partition rank instance of the firmware may also include storing the invalidated current partition rank instance of the firmware, including the firmware description table and the firmware images, to another location in the flash memory and/or to a memory storage device, such as a hard drive.

Figure 8:
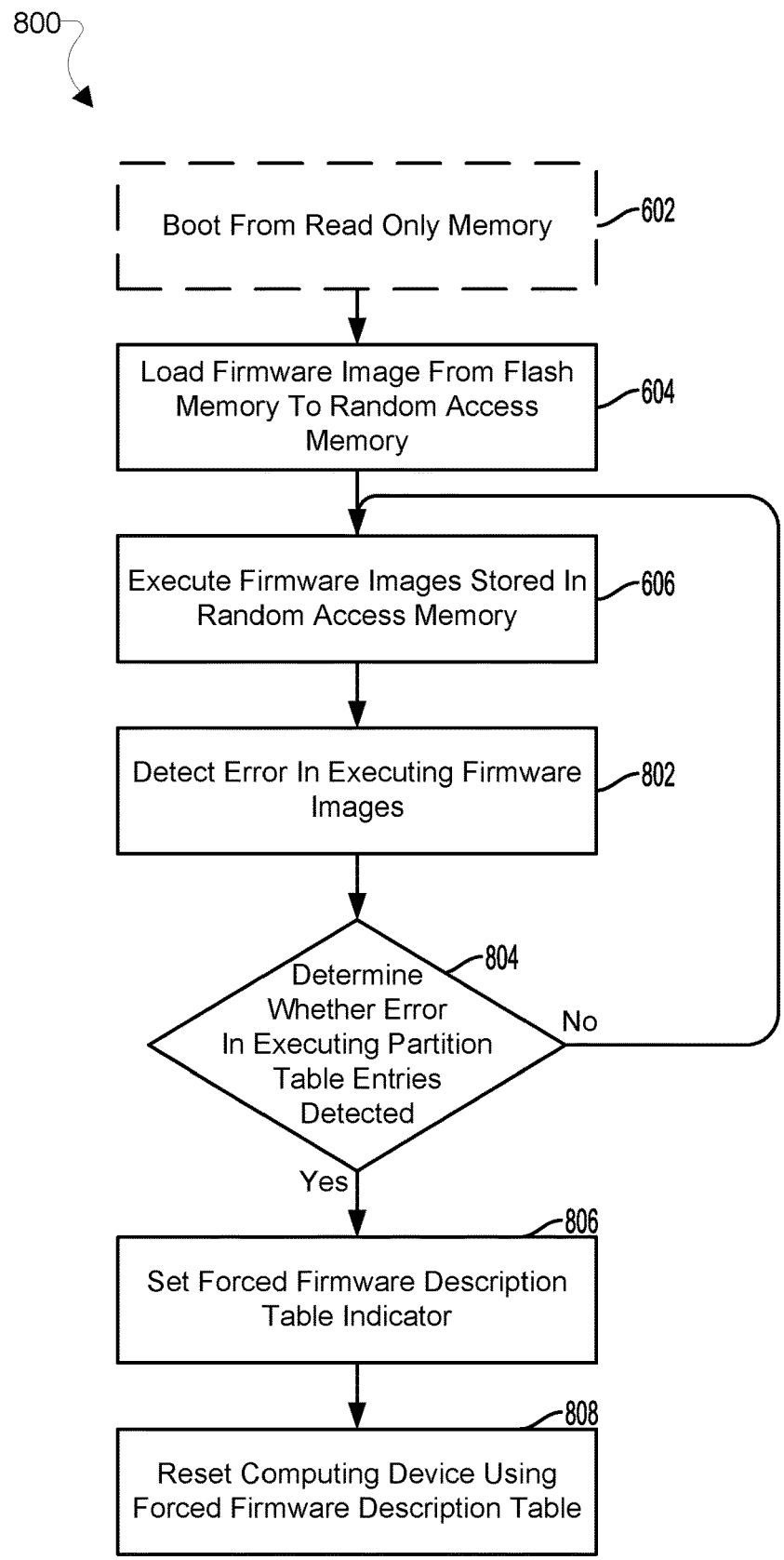
FIG. 8 is a process flow diagram illustrating a method for loading and switching to a particular reduced size firmware storage format version suitable according to an aspect.

FIG. 8 illustrates a method 800 for implementing loading and switching to a particular reduced size firmware storage format version suitable according to an aspect. The method 800 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, read only memory 232, flash memory 234, and random access memory 236 in FIG. 2, flash memory 500 in FIG. 5), and various memory/cache controllers. In order to encompass the alternative configurations enabled in various aspects, the hardware implementing the method 800 is referred to herein as a "processing device." In various aspects, the method 800 may further describe block 612 of the method 600 in FIG. 6 and/or be implemented as a standalone method.

In optional block 602, the processing device may boot the computing device and/or subsystem of the computing device using code stored in the read only memory. In block 604, the processing device may retrieve a firmware from the flash memory and load the firmware to the random access memory. In block 606, the processing device may execute the firmware images stored in the random access memory. In various aspects the optional block 602, the block 604, and the block 606 may be implemented as describe with reference to the (optional) block 602, the block 604, and the block 606 of the method 600, 700 in FIGS. 6 and 7.

In block 802, the processing device may detect an error in executing a firmware image of the firmware loaded to the random access memory. Error detection for execution of the firmware image may be implemented in a variety of known ways, including error detection and handling hardware and/or software, and/or using performance speed, time, power, and/or resources use monitoring and threshold comparison to determine whether such thresholds are exceeded indicating an error.

In block 804, the processing device may determine whether an error in executing a firmware image of the firmware loaded to the random access memory is detected. Determining whether an error is detected may include receiving an error signal and/or checking for an error indicator in a specified memory location, such as an error register.

In response to determining that an error in executing a firmware image of the firmware loaded to the random access memory is not detected (i.e., determination block 804="No"), the processing device may execute the firmware images stored in the random access memory in block 606.

In response to determining that an error in executing a firmware image of the firmware loaded to the random access memory is detected (i.e., determination block 804="Yes"), the processing device may set a forced firmware description table indicator in block 806. A forced firmware description indicator may be configured to indicate that a firmware description table designated for use as a force firmware description table is to be used to boot the computing device and/or the subsystem of the computing device for a next boot and/or reboot. The forced firmware description indicator may be stored in a specified memory location, such as a forced firmware description register, that maintains the setting for the forced firmware description indicator when the computing device and/or the subsystem of the computing device is booted and/or rebooted. The forced firmware description table may be any firmware description table that has a current or golden partition rank data in the rank field of the firmware description. In various aspects, the forced firmware description table may be a current partition rank instance of the firmware with an earlier version data value in the rank field of the firmware description table than the executing instance of the firmware. The forced firmware description table and/or an identifier for the forced firmware description table may be stored in a specified memory location, such as a forced firmware description register, that maintains the forced firmware description table and/or the identifier when the computing device and/or the subsystem of the computing device is booted and/or rebooted. The identifier for the forced firmware description table may include a unique combination of data in any combination of fields of the firmware description table and/or an indicator of a location in memory storing the forced firmware description table.

In block 808, the processing device may reset the computing device and/or subsystem of the computing device using the forced firmware description table. In various aspects resting the computing device may be implemented as described with reference to block 612 of the method 600 in FIG. 6, but particularly using the firmware description table designated as the forced firmware description table.

Figure 9:
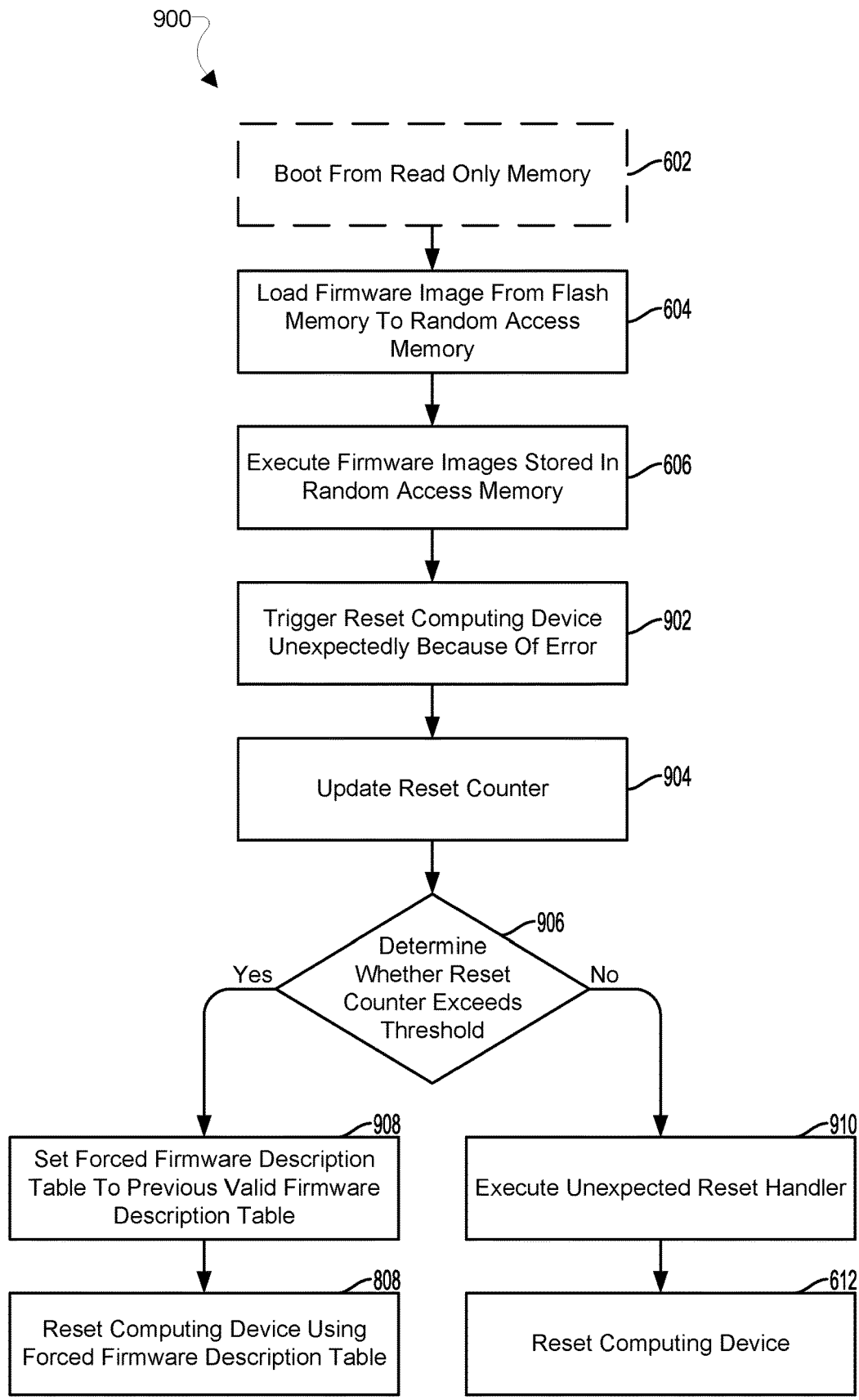
FIG. 9 is a process flow diagram illustrating a method for loading and reversing back to a previous reduced size firmware storage format version suitable according to an aspect.

FIG. 9 illustrates a method 900 for implementing loading and reversing back to a previous reduced size firmware storage format version suitable according to an aspect. The method 800 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, read only memory 232, flash memory 234, and random access memory 236 in FIG. 2, flash memory 500 in FIG. 5), and various memory/cache controllers. In order to encompass the alternative configurations enabled in various aspects, the hardware implementing the method 900 is referred to herein as a "processing device." In various aspects, the method 900 may further describe block 612 of the method 600 in FIG. 6 and/or be implemented as a standalone method.

In optional block 602, the processing device may boot the computing device and/or subsystem of the computing device using code stored in the read only memory. In block 604, the processing device may retrieve a firmware from the flash memory and load the firmware to the random access memory. In block 606, the processing device may execute the firmware images stored in the random access memory. In various aspects the optional block 602, the block 604, and the block 606 may be implemented as describe with reference to the (optional) block 602, the block 604, and the block 606 of the method 600, 700 in FIGS. 6 and 7.

In block 902, the processing device may trigger a reset of the computing device and/or subsystem of the computing device in response to detecting an error in executing a firmware image of the firmware loaded to the random access memory. Detecting an error may include receiving an error signal and/or checking for an error indicator in a specified memory location, such as an error register.

In block 904, the processing device may update a reset counter. A reset counter may include a counter and/or a timer that may be altered as errors occur in the execution of the firmware image of the firmware loaded to the random access memory. For example, a counter may be incremented in response to detection of an error. In another example, a timer may continue to count until it is reset in response to booting of the computing device and/or subsystem of the computing device completing, which may be delayed by errors occurring.

In determination block 906, the processing device may determine whether a value of the reset counter exceeds a reset threshold. The value of the reset counter may be logically and/or arithmetically compared with a value of the reset threshold to determine whether the value of the reset counter exceeds the reset threshold.

In response to determining that the value of the reset counter exceeds the reset threshold (i.e., determination block 906="Yes"), the processing device may set the forced firmware description table to a previous current and/or a golden partition ranked firmware description table having a valid status data in the status field of the firmware description table in block 908. Setting the forced firmware description table may be implemented as described herein with reference to block 806 of the method 800 in FIG. 8.

In block 808, the processing device may reset the computing device and/or subsystem of the computing device using the forced firmware description table, as described herein with reference to block 808 of the method 800 in FIG. 8.

In response to determining that the value of the reset counter does not exceed the reset threshold (i.e., determination block 906="No"), the processing device may execute an unexpected reset handler in block 910.

In block 612, the processing device may reset the computing device and/or subsystem of the computing device, as described with reference to block 612 of the method 600 illustrated in FIG. 6.

Figure 10:
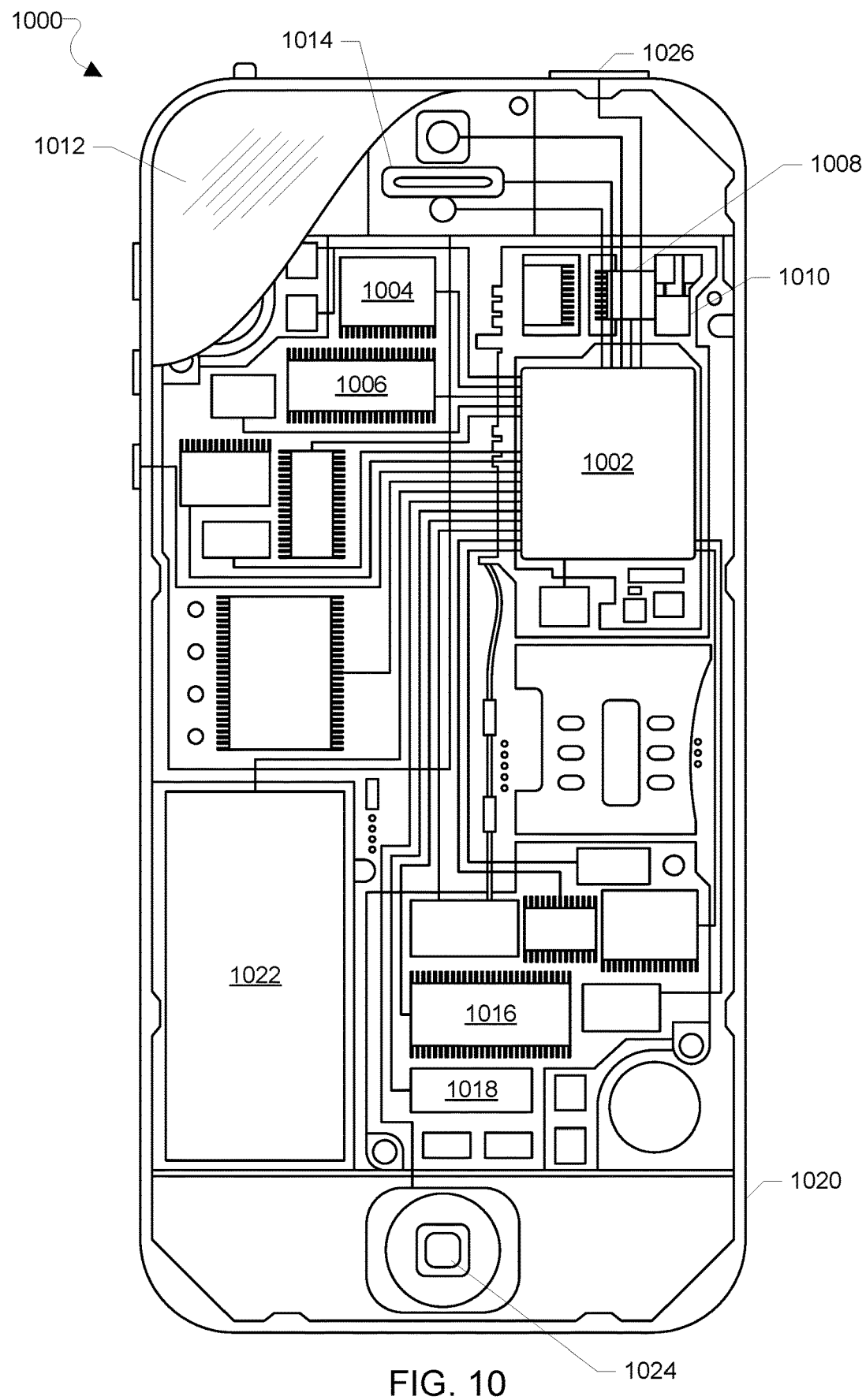
FIG. 10 is a component block diagram illustrating an example mobile computing device suitable for use with the various aspects.

The various aspects (including, but not limited to, aspects described above with reference to FIGS. 1-9) may be implemented in a wide variety of computing systems including mobile computing devices, an example of which suitable for use with the various aspects is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The mobile computing device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
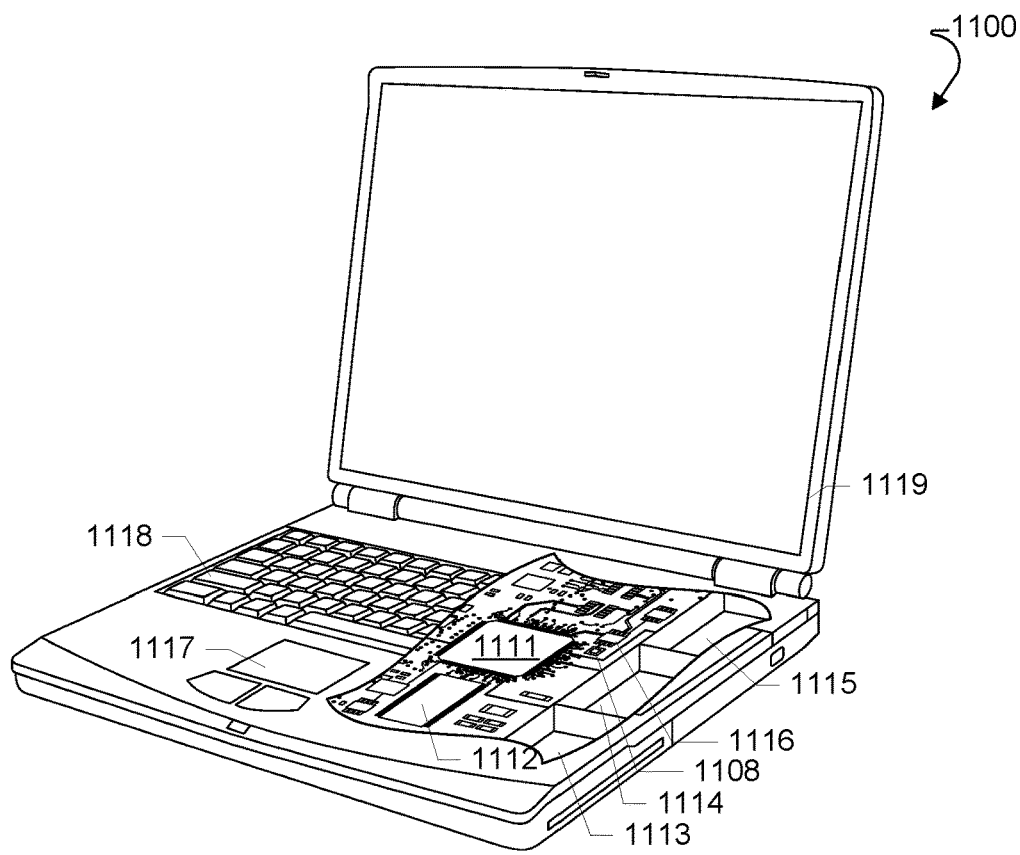
FIG. 11 is a component block diagram illustrating an example mobile computing device suitable for use with the various aspects.

The various aspects (including, but not limited to, aspects described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be used in conjunction with the various aspects.

Figure 12:
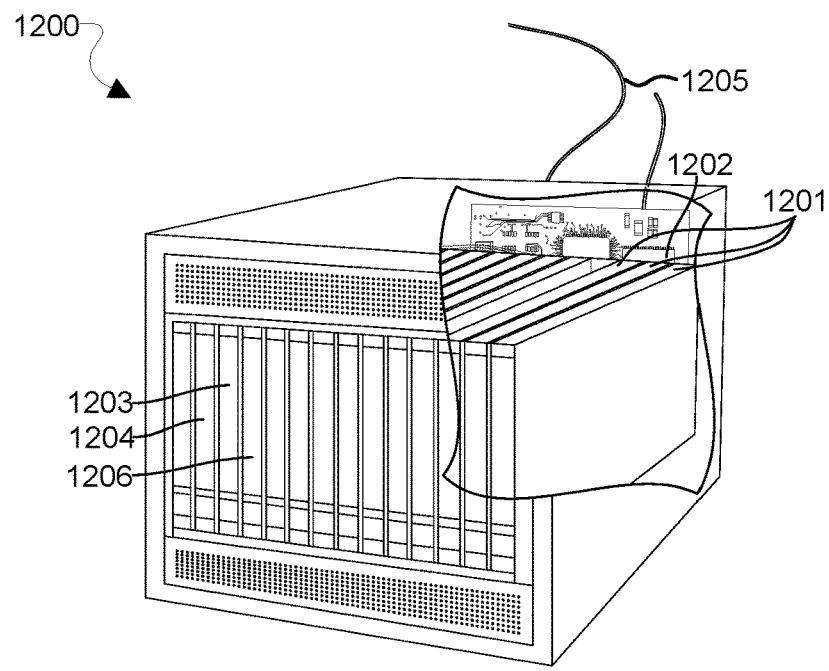
FIG. 12 is a component block diagram illustrating an example server suitable for use with the various aspects.

The various aspects (including, but not limited to, aspects described above with reference to FIGS. 1-9) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory, such as a disk drive 1204. As illustrated in FIG. 12, multicore processor assemblies 1201 may be added to the server 1200 by inserting them into the racks of the assembly. The server 1200 may also include a floppy disc drive, compact disc (CD) or digital versatile disc (DVD) disc drive 1206 coupled to the processor 1201. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing a reduced size firmware storage format on a computing device, comprising:
storing a first firmware description table to a first sector of a flash memory, wherein the first firmware description table comprises a first plurality of fields of data configured to define a first instance of a firmware including describing a first plurality of firmware images;
storing the first plurality of firmware images to a first plurality of consecutive sectors of the flash memory;
storing a second firmware description table to a second sector of the flash memory consecutive to the first sector, wherein the second firmware description table comprises a second plurality of fields of data configured to define a second instance of the firmware including describing a second plurality of firmware images comprising a third plurality of firmware images;
storing the third plurality of firmware images to a second plurality of consecutive sectors of the flash memory consecutive to the first plurality of consecutive sectors; and
booting the computing device using the second firmware description table by executing the second plurality of firmware images.

2. The method of claim 1, wherein the second plurality of firmware images further comprises at least one firmware image of the first plurality of firmware images.

3. The method of claim 2, wherein:
describing a first plurality of firmware images comprises identifying locations in the flash memory storing the first plurality of firmware images comprising a first logical partition of the flash memory; and
describing a second plurality of firmware images comprises identifying locations in the flash memory storing the at least one firmware image of the first plurality of firmware images and the third plurality of firmware images comprising a second logical partition of the flash memory overlapping the first logical partition at a first location in the flash memory storing the at least one firmware image of the first plurality of firmware images.

4. The method of claim 1, further comprising resetting the computing device in response to receiving the second firmware description table.

5. The method of claim 1, further comprising determining whether booting the computing device using the second firmware description table is successful.

6. The method of claim 5, wherein:
the first plurality of fields of data comprises a current partition rank data and a valid status data; and
the second plurality of fields of data comprises a trial partition rank data and the valid status data;
the method further comprising:
in response to determining that booting the computing device using the second firmware description table is successful:
setting the trial partition rank data to the current partition rank data; and
setting the valid status data of the first plurality of fields of data to an invalid status data; and
setting the valid status data of the second plurality of fields of data to an invalid status data in response to determining that booting the computing device using the second firmware description table is not successful.

7. The method of claim 5, further comprising:
setting a forced firmware description table indicator in response to determining that booting the computing device using the second firmware description table is not successful;

resetting the computing device; and
booting the computing device using a forced firmware description table.

8. The method of claim 5, wherein:
the first plurality of fields of data comprises a current partition rank data and a first version data; and
the second plurality of fields of data comprises the current partition rank data and a second version data configured to indicate that the second instance of the firmware is a newer instance of the firmware than the first instance of the firmware,
the method further comprising:
setting a forced firmware description table to the first firmware description table comprising the first version data in response to determining that booting the computing device using the second firmware description table is not successful;
resetting the computing device; and
booting the computing device using the forced firmware description table.

9. A computing device, comprising:
a flash memory; and
a processor configured to perform operations comprising:
storing a first firmware description table to a first sector of the flash memory, wherein the first firmware description table comprises a first plurality of fields of data configured to define a first instance of a firmware including describing a first plurality of firmware images;
storing the first plurality of firmware images to a first plurality of consecutive sectors of the flash memory;
storing a second firmware description table to a second sector of the flash memory consecutive to the first sector, wherein the second firmware description table comprises a second plurality of fields of data configured to define a second instance of the firmware including describing a second plurality of firmware images comprising a third plurality of firmware images;
storing the third plurality of firmware images to a second plurality of consecutive sectors of the flash memory consecutive to the first plurality of consecutive sectors; and
booting the computing device using the second firmware description table by executing the second plurality of firmware images.

10. The computing device of claim 9, wherein the second plurality of firmware images further comprises at least one firmware image of the first plurality of firmware images.

11. The computing device of claim 10, wherein the processor is configured to perform operations such that:
describing a first plurality of firmware images comprises identifying locations in the flash memory storing the first plurality of firmware images comprising a first logical partition of the flash memory; and
describing a second plurality of firmware images comprises identifying locations in the flash memory storing the at least one firmware image of the first plurality of firmware images and the third plurality of firmware images comprising a second logical partition of the flash memory overlapping the first logical partition at a first location in the flash memory storing the at least one firmware image of the first plurality of firmware images.

12. The computing device of claim 9, wherein the processor is configured to perform operations further comprising resetting the computing device in response to receiving the second firmware description table.

13. The computing device of claim 9, wherein the processor is configured to perform operations further comprising determining whether booting the computing device using the second firmware description table is successful.

14. The computing device of claim 13, wherein:
the processor is configured to perform operations such that:
the first plurality of fields of data comprises a current partition rank data and a valid status data; and
the second plurality of fields of data comprises a trial partition rank data and the valid status data; and
the processor is configured to perform operations further comprising:
in response to determining that booting the computing device using the second firmware description table is successful:
setting the trial partition rank data to the current partition rank data; and
setting the valid status data of the first plurality of fields of data to an invalid status data; and
setting the valid status data of the second plurality of fields of data to an invalid status data in response to determining that booting the computing device using the second firmware description table is not successful.

15. The computing device of claim 13, wherein the processor is configured to perform operations further comprising:
setting a forced firmware description table indicator in response to determining that booting the computing device using the second firmware description table is not successful;
resetting the computing device; and
booting the computing device using a forced firmware description table.

16. The computing device of claim 13, wherein:
the processor is configured to perform operations such that:
the first plurality of fields of data comprises a current partition rank data and a first version data; and
the second plurality of fields of data comprises the current partition rank data and a second version data configured to indicate that the second instance of the firmware is a newer instance of the firmware than the first instance of the firmware; and
the processor is configured to perform operations further comprising:
setting a forced firmware description table to the first firmware description table comprising the first version data in response to determining that booting the computing device using the second firmware description table is not successful;
resetting the computing device; and
booting the computing device using the forced firmware description table.

17. A computing device, comprising:
means for storing a first firmware description table to a first sector of a flash memory, wherein the first firmware description table comprises a first plurality of fields of data configured to define a first instance of a firmware including describing a first plurality of firmware images;
means for storing the first plurality of firmware images to a first plurality of consecutive sectors of the flash memory;

means for storing a second firmware description table to a second sector of the flash memory consecutive to the first sector, wherein the second firmware description table comprises a second plurality of fields of data configured to define a second instance of the firmware including describing a second plurality of firmware images comprising a third plurality of firmware images;

means for storing the third plurality of firmware images to a second plurality of consecutive sectors of the flash memory consecutive to the first plurality of consecutive sectors; and means for booting the computing device using the second firmware description table by executing the second plurality of firmware images.

18. The computing device of claim 17, wherein:

the second plurality of firmware images further comprises at least one firmware image of the first plurality of firmware images;

means for describing a first plurality of firmware images comprises means for identifying locations in the flash memory storing the first plurality of firmware images comprising a first logical partition of the flash memory; and means for describing a second plurality of firmware images comprises means for identifying locations in the flash memory storing the at least one firmware image of the first plurality of firmware images and the third plurality of firmware images comprising a second logical partition of the flash memory overlapping the first logical partition at a first location in the flash memory storing the at least one firmware image of the first plurality of firmware images.

19. The computing device of claim 17, further comprising means for resetting the computing device in response to receiving the second firmware description table.

20. The computing device of claim 17, further comprising means for determining whether booting the computing device using the second firmware description table is successful.

21. The computing device of claim 20, wherein:

the first plurality of fields of data comprises a current partition rank data and a valid status data; and the second plurality of fields of data comprises a trial partition rank data and the valid status data; and the computing device further comprises:

means for setting the trial partition rank data to the current partition rank data in response to determining that booting the computing device using the second firmware description table is successful;

means for setting the valid status data of the first plurality of fields of data to an invalid status data in response to determining that booting the computing device using the second firmware description table is successful; and means for setting the valid status data of the second plurality of fields of data to an invalid status data in response to determining that booting the computing device using the second firmware description table is not successful.

22. The computing device of claim 20, further comprising:

means for setting a forced firmware description table indicator in response to determining that booting the computing device using the second firmware description table is not successful;

means for resetting the computing device; and means for booting the computing device using a forced firmware description table.

23. The computing device of claim 20, wherein:

the first plurality of fields of data comprises a current partition rank data and a first version data; and the second plurality of fields of data comprises the current partition rank data and a second version data configured to indicate that the second instance of the firmware is a newer instance of the firmware than the first instance of the firmware; and the computing device further comprises:

means for setting a forced firmware description table to the first firmware description table comprising the first version data in response to determining that booting the computing device using the second firmware description table is not successful;

means for resetting the computing device; and means for booting the computing device using the forced firmware description table.

24. A non-transitory processor-readable storage medium having stored thereon processor-executable instructions configured to cause a processor of a computing device to perform operations comprising:

storing a first firmware description table to a first sector of a flash memory, wherein the first firmware description table comprises a first plurality of fields of data configured to define a first instance of a firmware including describing a first plurality of firmware images;

storing the first plurality of firmware images to a first plurality of consecutive sectors of the flash memory;

storing a second firmware description table to a second sector of the flash memory consecutive to the first sector, wherein the second firmware description table comprises a second plurality of fields of data configured to define a second instance of the firmware including describing a second plurality of firmware images comprising a third plurality of firmware images;

storing the third plurality of firmware images to a second plurality of consecutive sectors of the flash memory consecutive to the first plurality of consecutive sectors; and booting the computing device using the second firmware description table by executing the second plurality of firmware images.

25. The non-transitory processor-readable storage medium of claim 24, wherein:

the second plurality of firmware images further comprises at least one firmware image of the first plurality of firmware images; and the stored processor-executable instructions are configured to cause a processor of a computing device to perform operations such that:

describing a first plurality of firmware images comprises identifying locations in the flash memory storing the first plurality of firmware images comprising a first logical partition of the flash memory; and describing a second plurality of firmware images comprises identifying locations in the flash memory storing the at least one firmware image of the first plurality of firmware images and the third plurality of firmware images comprising a second logical partition of the flash memory overlapping the first logical partition at a first location in the flash memory storing the at least one firmware image of the first plurality of firmware images.

26. The non-transitory processor-readable storage medium of claim 24, wherein the stored processor-executable instructions are configured to cause a processor of a computing device to perform operations further comprising resetting the computing device in response to receiving the second firmware description table.

27. The non-transitory processor-readable storage medium of claim 24, wherein the stored processor-executable instructions are configured to cause a processor of a computing device to perform operations further comprising determining whether booting the computing device using the second firmware description table is successful.

28. The non-transitory processor-readable storage medium of claim 27, wherein:
the stored processor-executable instructions are configured to cause a processor of a computing device to perform operations such that:
the first plurality of fields of data comprises a current partition rank data and a valid status data; and
the second plurality of fields of data comprises a trial partition rank data and the valid status data; and
the stored processor-executable instructions are configured to cause a processor of a computing device to perform operations further comprising:
in response to determining that booting the computing device using the second firmware description table is successful:
setting the trial partition rank data to the current partition rank data; and
setting the valid status data of the first plurality of fields of data to an invalid status data; and
setting the valid status data of the second plurality of fields of data to an invalid status data in response to determining that booting the computing device using the second firmware description table is not successful.

29. The non-transitory processor-readable storage medium of claim 27, wherein the stored processor-executable instructions are configured to cause a processor of a computing device to perform operations further comprising:
setting a forced firmware description table indicator in response to determining that booting the computing device using the second firmware description table is not successful;
resetting the computing device; and
booting the computing device using a forced firmware description table.

30. The non-transitory processor-readable storage medium of claim 27, wherein:
the stored processor-executable instructions are configured to cause a processor of a computing device to perform operations such that:
the first plurality of fields of data comprises a current partition rank data and a first version data; and
the second plurality of fields of data comprises the current partition rank data and a second version data configured to indicate that the second instance of the firmware is a newer instance of the firmware than the first instance of the firmware; and
the stored processor-executable instructions are configured to cause a processor of a computing device to perform operations further comprising:
setting a forced firmware description table to the first firmware description table comprising the first version data in response to determining that booting the computing device using the second firmware description table is not successful;
resetting the computing device; and
booting the computing device using the forced firmware description table.

* * * * *